United States Patent [19]

Herron et al.

[11] Patent Number: 5,786,595

[45] Date of Patent: Jul. 28, 1998

[54] METHOD FOR ESTIMATING LITHOLOGICAL FRACTIONS USING NUCLEAR SPECTROSCOPY MEASUREMENTS

[75] Inventors: Susan L. Herron; Michael M. Herron, both of Ridgefield, Conn.

[73] Assignee: Schlumberger Technology Corporation, Ridgefield, Conn.

[21] Appl. No.: 625,459

[22] Filed: Mar. 29, 1996

[51] Int. Cl.$^6$ ................................................ G01V 5/00

[52] U.S. Cl. ................................. 250/256; 250/269.6

[58] Field of Search ........................ 250/269.6, 256

[56] References Cited

U.S. PATENT DOCUMENTS

| | | |
|---|---|---|
| 3,521,064 | 7/1970 | Moran et al. . |
| 4,055,763 | 10/1977 | Antkiw . |
| 4,208,580 | 6/1980 | Schweitzer et al. ............ 250/262 |
| 4,317,993 | 3/1982 | Hertzog, Jr. et al. . |
| 4,722,220 | 2/1988 | Herron .................... 73/152.14 |
| 5,097,123 | 3/1992 | Grau et al. . |
| 5,471,057 | 11/1995 | Herron .................... 250/296.6 |

OTHER PUBLICATIONS

B. Roscoe et al., "Non–Conventional Applications of Through–Tubing Carbon–Oxygen Logging Tools," *SPWLA 36th Annual Logging Symposium* (Jun. 26–29, 1995).

K. Bhuyan et al., "Clay Estimation From GR and Neutron–Density Porosity Logs," *SPWLA 35th Annual Logging Symposium* (Jun. 19–22, 1994).

Jack LaVigne et al., "Density–Neutron Interpretation in Shaly Sands," *SPWLA 35th Annual Logging Symposium* (Jun. 19–22, 1994).

R. Hertzog et al., "Geochemical Logging With Spectrometry Tools," *SPE 16792*, Dallas, TX (Sep. 27–30, 1987).

*Primary Examiner*—Constantine Hannaher
*Attorney, Agent, or Firm*—David Garrod; Brigitte L. Jeffery; Keith G. W. Smith

[57] ABSTRACT

A method for determining total clay content of an earth formation based on elemental concentration logs obtained from a logging tool. This method avoids the need for obtaining an aluminum concentration measurement. First, the concentrations of a plurality of elements in the formation are determined without measuring an aluminum concentration. Then, at least the silicon, calcium, and iron concentrations are combined in accordance with a function determined by regression analysis to produce an estimate of the total clay content.

15 Claims, 8 Drawing Sheets

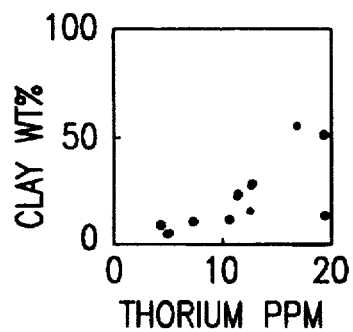
FIG.4a
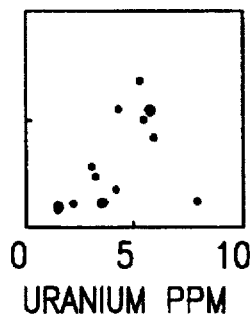
FIG.4b
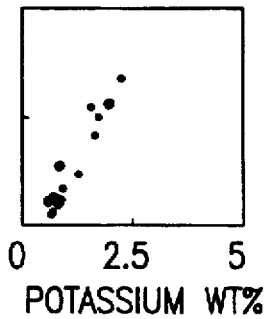
FIG.4c
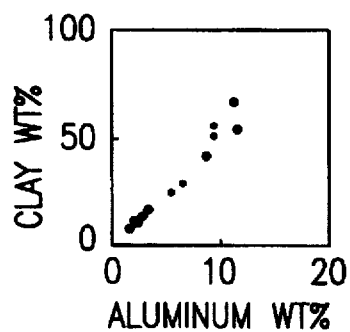
FIG.4d
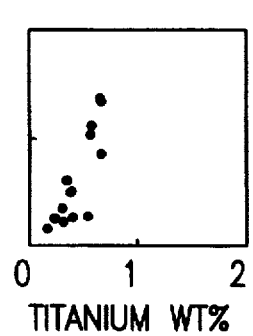
FIG.4e
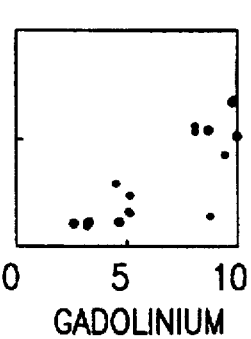
FIG.4f
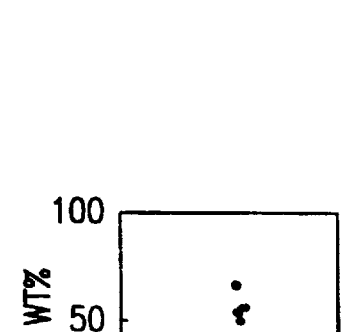
FIG.4g
FIG.4h
FIG.4i

METHOD FOR ESTIMATING LITHOLOGICAL FRACTIONS USING NUCLEAR SPECTROSCOPY MEASUREMENTS

BACKGROUND OF THE INVENTION

The present invention relates to the estimation of lithological fractions from downhole nuclear spectroscopy measurements. In particular, the invention provides a method for estimating the clay, carbonate, and sand content of formations surrounding a borehole based on elemental concentration logs.

It is known that since thorium, uranium, and potassium are generally concentrated in clay, the natural gamma radioactivity of an earth formation is one of the most reliable qualitative clay indicators. The quantitative indication of clay, however, is less than desired for the reason that several radioactive minerals, which are not related to clay, are also encountered in sedimentary areas. This is the case in particular for the micaceous sands which contain potassium and for the shaly sands which contain potassium feldspar, and trace minerals containing thorium. The presence of these radioactive minerals not related to clay is clearly indicated by the high value of the relative content of the radioactive element involved in the concerned layer compared to the values of the relative content of the same element in adjacent layers.

Another problem with using the natural gamma radioactivity of an earth formation as a quantitative clay indicator is due to the fact that a high value of the relative content of uranium, that is, a value significantly higher than those generally encountered in standard clay, is often related in sedimentary rocks to the presence of organic materials. Marine shales, which are rich in organic matter, have therefore an exceptionally high uranium content. Since there are both clay and non-clay contributors to the gamma ray signal, direct proportionality between clay content and gamma ray is not assured.

While natural gamma radioactivity remains an easy and inexpensive measurement that produces qualitative clay estimates, converting natural gamma ray to clay requires core calibration and still results in relatively large error margins, particularly in clean sands. Attempts to improve both the estimate of total clay and the determination of clay type led to the development of spectral gamma ray tools. In most cases, the spectral gamma ray components, thorium, uranium, and potassium, provide estimates which are only marginally better than those provided by total gamma ray.

One relatively constant component of clay minerals is aluminum. The abundance of aluminum in sedimentary rocks is significant in clays where it can be as large as 20% by weight, however, it is expensive and troublesome to accurately measure aluminum by logging devices.

It is desirable to accurately and completely determine the lithology of a formation. The photoelectric absorption factor, $P_e$, of a formation is a useful means for identifying the three major types of rock matrix: sandstone, dolomite, and limestone in the absence of clay. Thus, the absorption factor can easily resolve questions of binary lithology mixtures. However, none of the heretofore known means which, for example, distinguish sandstone from carbonate, also determine the fraction of clay carbonate present in a formation.

SUMMARY OF THE INVENTION

The above disadvantages of the prior art are overcome by means of the subject invention. The method for deriving the total clay content in a formation surrounding a borehole comprises the steps of determining concentrations of a plurality of elements in formation without measuring an aluminum concentration, estimating the aluminum concentration in the formation from a selected group of elemental concentrations, and inputting the estimated aluminum concentration and the selected group of elemental concentrations into a predetermined equation to derive total clay content in the formation. The method for deriving the carbonate content in a formation surrounding a borehole comprises the steps of determining the elemental concentration of calcium in the formation without measuring a magnesium concentration, and inputting the calcium concentration into a predetermined equation to estimate a sum total of calcium and dolomite in the formation. The method for determining the sand content in a formation surrounding a borehole comprises the steps of determining a total clay content in the formation, determining a carbonate content in the formation, and deriving the sand fraction from the total clay and the carbonate content.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings:

FIGS. 4a–4i show a plot of individual chemical elements against total clay;

DETAILED DESCRIPTION OF THE PREFERRED EMBODIMENT

Figure 1:
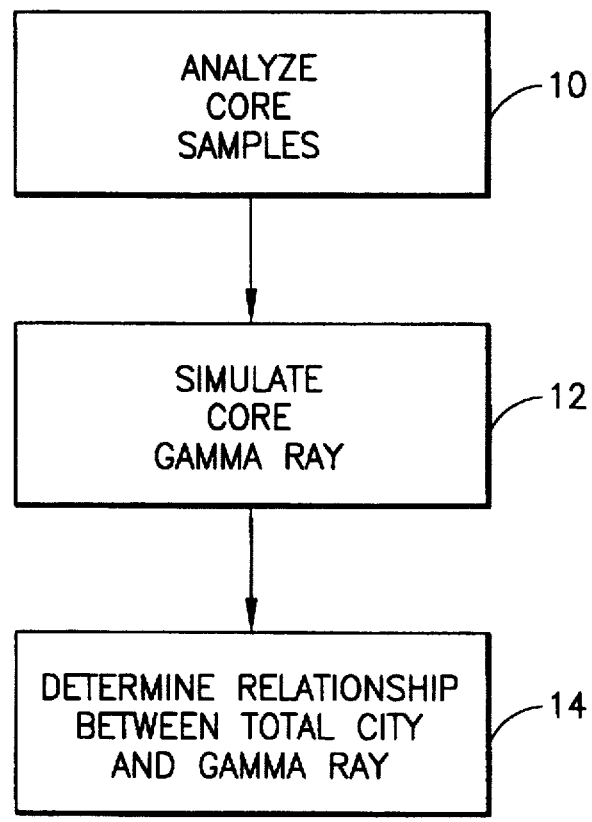
FIG. 1 is a flow diagram depicting a method for analyzing core samples.

In some oil fields, core samples from a well borehole are available for analyzing formation lithology. Referring to FIG. 1, a flow diagram depicts a method for analyzing core samples for total clay content using gamma ray measurements. In block 10, the core samples are analyzed for chemistry and mineralogy, including clay content, via standard laboratory techniques such as FT-IR or X-ray diffraction and chemical analysis. The mineralogical composition of the core samples is preferably determined through a regression of the sample spectra against a set of mineral standards in a non-negative least squares optimization. At 12, a synthetic core gamma ray may be computed from core chemistry results using the following to provide a gamma ray response:

$$GR = 4Th + 8U + 16K, \quad (1)$$

which is an approximation of a matrix gamma ray. At 14, the relationship between total clay and gamma ray may be determined using the following empirical relationship known to those skilled in the art:

$$Vshale=(GR_{log}-GR_{min})/(GR_{max}-GR_{min}). \quad (2)$$

This basis for obtaining an adequate estimate of the clay mineral content is based on studies which indicate that shale commonly contains about 60 wt % clay minerals. See LaVigne, Herron, and Hertzog, "Density Neutron Interpretation in Shaly Sands," SPWLA 35th Annual Logging Symposium, Jun. 19–22, 1994; and Bhuyan and Passey, "Clay Estimation from GR and Neutron-Density Porosity Logs," SPWLA 35th Annual Logging Symposium, Jun. 19–22, 1994.

The relationship between total clay and a synthetic gamma ray, computed from Th, U, and K concentration derived in block 10, for core samples from many wells is presented in FIGS. 2a–2l. A line connecting the origin with 100% clay and 250 API is included for reference purposes. For FIGS. 2a–2l, the gamma ray measurement generally increases as clay content increases. While this relationship between gamma ray and total clay is useful and may be used to estimate the quantity of clay in a formation, FIGS. 2a–2l also demonstrate several disadvantages of using gamma ray to estimate total clay.

Figure 2:
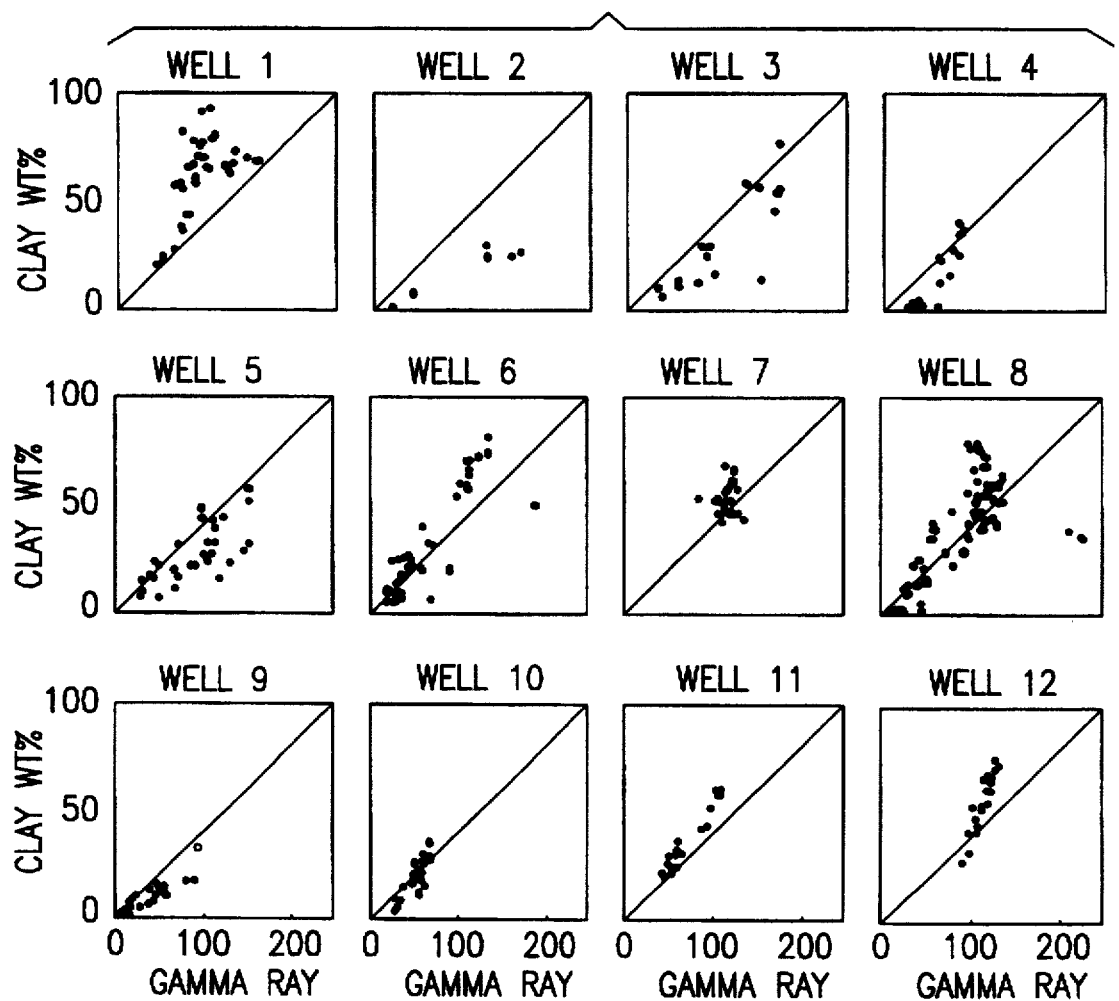
FIG. 2 represents a synthetic gamma ray plotted against total clay.

First, the large range of slopes in the gamma ray versus clay plots indicate the necessity for local calibration. Referring to FIG. 2a, a linear trend would predict a maximum gamma ray value of about 100 API for pure clay. According to FIG. 2b, a linear trend would predict a maximum gamma ray value of about 500 API for pure clay. FIG. 2d indicates a minimum gamma ray of 30 API for zero clay while in FIG. 2l, an extrapolation points to 70 API for a minimum gamma ray. With core calibration, the amount of clay is known and it is possible to accurately extrapolate to zero clay. With elemental concentrations available from log data only, a minimum gamma ray must be selected without actual knowledge of the zero clay point. Second, FIGS. 2a–2l exhibit significant scatter in the data points, particularly FIGS. 2c–2g. The scatter in the data would produce an uncertainty of at least ±20 wt % and is therefore an unreliable predictor of total clay. Third, some of the wells, particularly that represented in FIG. 2l and to a lesser extent that represented in FIG. 2b, exhibit a small dynamic range in gamma ray while clay content varies considerably. Given these problems with gamma ray, it is unlikely that one could accurately predict total clay content using natural gamma ray measurements for a plurality of wells representing a broad spectrum in terms of amount and type of clay.

Figure 3:
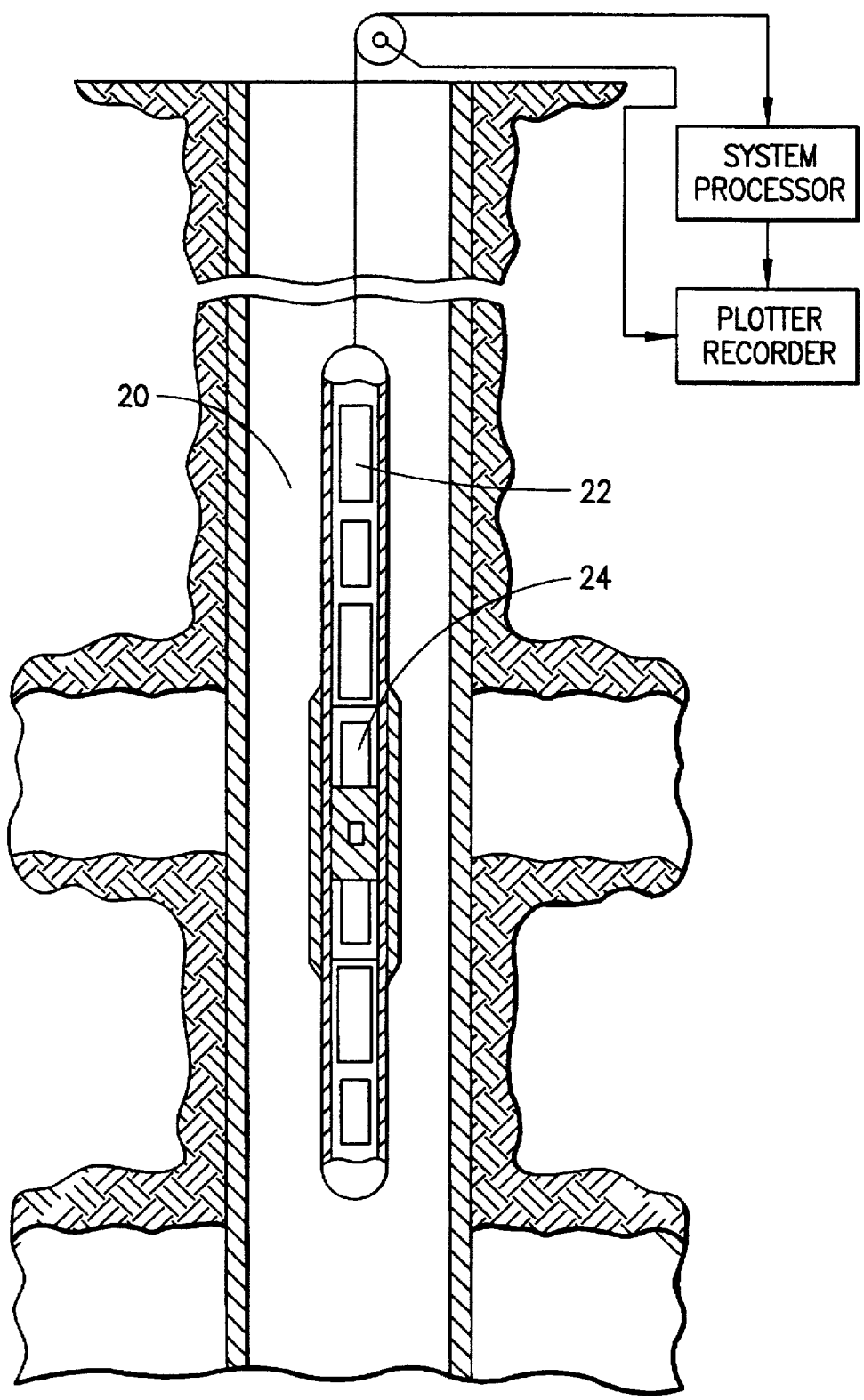
FIG. 3 illustrates a prior art well logging tool.

Aluminum shows a strong correlation to total clay content but the heretofore known tools which measure the aluminum concentration by wireline techniques are expensive and troublesome. U.S. Pat. No. 5,097,123 describes a typical prior art tool such as the one illustrated in FIG. 3. A tool string 20 includes three tool systems successively arranged along the string 20. A communication cartridge 22 is provided at the upper part of the tool string 20 below which is located a first tool system which includes a tool for measuring the natural gamma radiation. An electronic cartridge 24 designed to acquire or otherwise process data coming from the different tool systems of the whole tool string 20 is situated below the first tool system and a second tool system which is designed to determine the relative elemental yields of elements of interest in the earth formations by irradiating the formation with neutrons and measuring yields of the prompt gamma rays resulting from capture of neutrons by the atoms corresponding to those elements is disposed below the cartridge 24. The second tool system generally comprises a first detector, a second detector, and a broad energy spectra neutron source disposed between the first and second detectors. The third tool system is designed to determine the absolute aluminum concentration and generally comprises a broad energy spectra source and a detector, including associated photomultiplier tubes and electronic circuitry, for measuring the number and energy distribution of the delayed gamma rays incident upon the detector.

Since the subject invention does not require either aluminum activation or natural radiation measurements to determine elemental concentrations, preferably, a single tool system is employed. In an open hole environment, an elemental capture spectroscopy (hereinafter, "ECS", a trademark of Schlumberger Technology Corporation) sonde may generate a geochemical log. Alternately, in a cased hole environment, a reservoir saturation tool (hereinafter, "RST", a trademark of Schlumberger Technology Corporation) may generate a useful elemental concentration log. Other tool systems which do not require aluminum activation or natural radiation measurements, such as a tool described in any of U.S. Pat. No. 3,521,064, U.S. Pat. No. 4,055,763, and U.S. Pat. No. 4,317,993, are within contemplation of the subject invention.

The present invention has been developed to estimate total clay based on elemental concentration logs obtained from a single, induced neutron gamma ray spectrometer. To develop the subject method, core samples were gathered from many wells representing a broad spectrum in terms of amount and type of clay. The wells show the presence of illite, kaolinite, smectite, feldspar, quartz, calcite, dolomite, mica and other trace minerals. The wells range from those having a low to moderate clay content to those having a high clay content. The average total clay content ranges from less than 10% by weight to almost 60% by weight.

FIGS. 4a–4i present total clay compared with nine elemental concentrations for a well. The three components of natural gamma ray, Th, U, and K are presented in FIGS. 4a–4c. FIG. 4d illustrates a comparison of clay with aluminum. Aluminum exhibits a strong correlation with the total clay. Clays are aluminosilicates, therefore, aluminum is a major element in and an integral part of the chemical composition of all clays. This is very different from the case of thorium and uranium which occur at trace levels and which are not structural components of the clays. Referring to FIG. 4g, silicon shows a complementary anti-correlation to clay content, but the simple linear relationship between silicon and clay is distorted by carbonate minerals or iron-rich minerals. The carbonate content is chemically represented by calcium and sometimes iron.

In a preferred embodiment of the invention, the elements silicon, calcium, and iron can be used to produce an accurate, economical estimation of clay content. The advantages to using these elements include a near constant slope, small degree of scatter, and near zero intercept. A total clay estimate using these elements is independent of fluid volume, type, and density, thereby rendering the estimate free from gas or light hydrocarbon effects.

The first step of the subject invention is to provide an estimate of aluminum using the elemental concentrations of silicon, calcium, and iron as:

$$Al=a(100-SiO_2-CaCO_3-MgCO_3-bFe) \quad (3)$$

where the values of a and b derived by a least absolute error regression analysis might be 0.34 and 1.99 respectively. Equation (3) produces an estimate of Al with a correlation coefficient between measured and estimated aluminum of 0.99 and a standard error of 0.6 wt % Al. Generally, aluminum and silicon are anti-correlated. Deviations from this general observation may occur when carbonate minerals are present in the formation thereby sending the concentrations of both silicon and aluminum towards zero. The subject invention compensates for the presence of carbonate minerals using concentrations of Ca and Mg. While numerous minerals are present in a formation, calcite ($CaCO_3$) and dolomite $CaMg(CO_3)_2$ are the predominate carbonate minerals and dominant sources of Ca and Mg. It is well within contemplation of the subject invention to compensate for the contribution of carbonate minerals using concentrations other than Ca and Mg so long as the means for compensation results in the silicon concentration varying linearly with the aluminum concentration.

Figure 5:
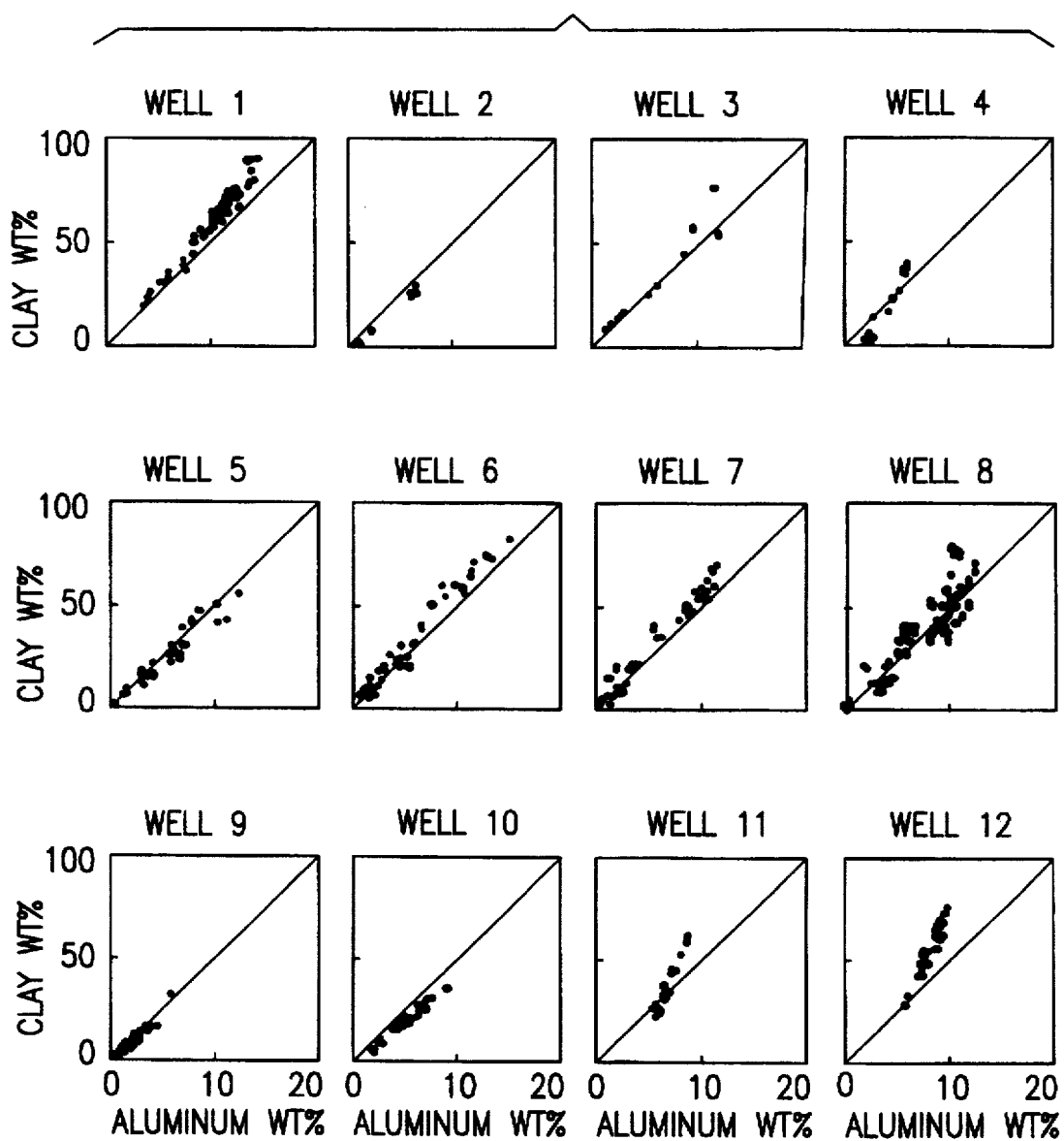
FIG. 5 shows a plot of aluminum versus total clay.

Deviations from the general observation that aluminum and silicon are anti-correlated may further be the result of other minerals, such as heavy iron minerals including, but not limited to, siderite and pyrite, present in the formation. The subject invention compensates for the presence of other minerals, such as heavy iron minerals, by including a weighted iron contribution to the estimate for aluminum. FIG. 5 diagrammatically illustrates the correlation between aluminum and clay. Superimposed on each well plot is a least absolute error regression of aluminum on clay. The slope of the line is 4.95, the correlation coefficient is 0.93, and the standard error is 7.4 wt %. In a majority of the wells, 4.95 Al is a robust estimator of clay.

The second step of the subject invention is to provide an estimate of total clay using the elemental concentrations of silicon, calcium, and iron as:

$$Clay=c(100-SiO_2-CaCO_3-MgCO_3-dFe) \qquad (4)$$

where the values of c and d derived by a least absolute error regression analysis might be 1.67 and 1.99 respectively. Equation (4) produces an estimate of total clay with a correlation coefficient between measured and estimated clay of 0.94 and a standard error of 6.9 wt %.

Figure 6:
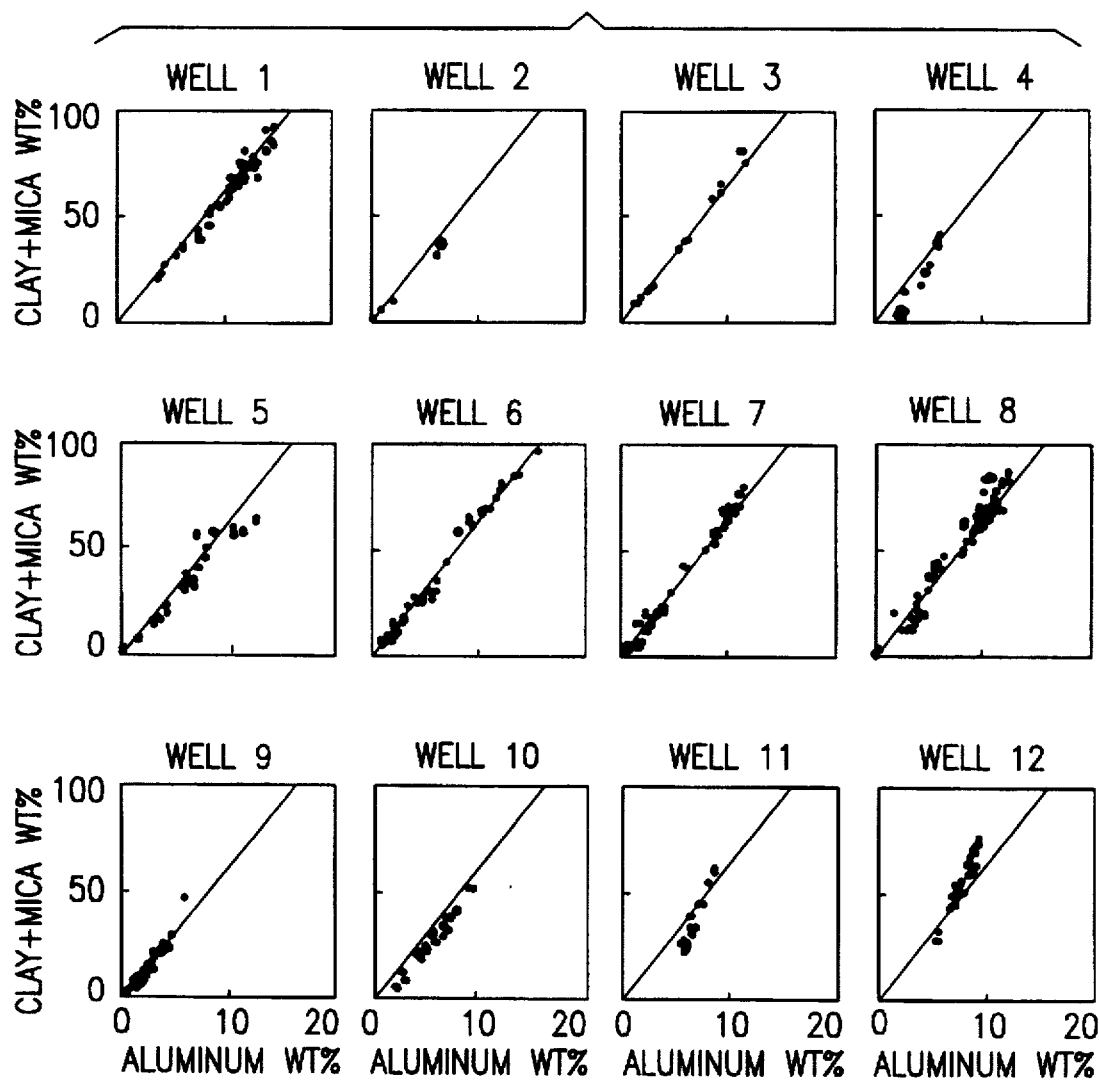
FIG. 6 shows a plot of aluminum versus the sum of total clay plus mica.

Alternatively, an estimate of total clay plus mica may be determined using the elemental concentrations of silicon, calcium, and iron as:

$$Clay+Mica=a(100-SiO_2-CaCO_3-MgCO_3-bFe) \qquad (5)$$

where the values of a and b derived by a least absolute error regression analysis might be 2.20 and 1.99 respectively. Equation (5) produces an estimate of the sum of total clay plus mica with a correlation coefficient between the measured and estimated sum of 0.97 and a standard error of 6.5 wt %. Referring to FIG. 6, aluminum shows a substantially linear correlation with the sum of total clay plus mica.

In formations having feldspar rich sands, an estimate of total clay using the elemental concentrations of silicon, calcium, and iron results from application of the following equation:

$$Clay2=e+f(100-SiO_2-CaCO_3-MgCO_3-gFe) \qquad (6)$$

where the values of e, f, and g derived by a least absolute error regression analysis might be −20.8, 3.1, and 1.99 respectively.

Figure 7:
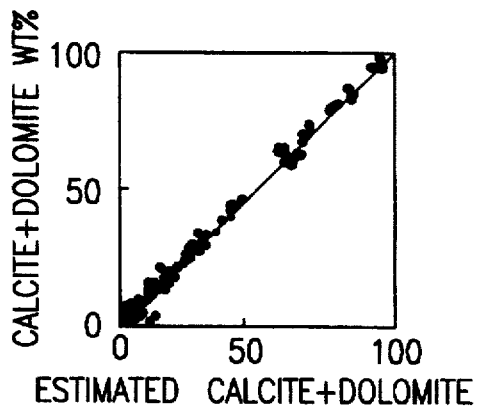
FIG. 7 shows a plot of the measured sum of calcite plus dolomite against the estimated sum of calcite plus dolomite.

To further develop a more complete lithological description of a formation, the carbonate fraction may be determined using the elemental concentration of calcium. Pure calcite ($CaCO_3$) formations have calcium concentrations of 40 wt %. A complication arises in dolomites ($CaMg(CO_3)_2$) because magnesium is generally not detected by spectroscopy logs. The gamma ray spectroscopy calcium can be characterized as being:

$$Ca_{log}=Ca+1.455 \text{ Mg} \qquad (7)$$

which accounts for the fact that the log Ca concentration is about 40 wt % in a pure calcite and also in dolomite. See Hertzog, Colson, Seeman, O'Brien, Scott, McKeon, Wraight, Grau, Ellis, Schweitzer, and Herron, "Geochemical logging with Spectrometry Tools," SPE 62nd Annual Technical Conference and Exhibition Proceedings; and Roscoe, Grau, Minh, and Freeman, "Non-conventional Applications of Through-Tubing Carbon-Oxygen Logging Tools," SPWLA 34th Annual Logging Symposium Transactions. Using data from the core samples to estimate carbonate results in the following function:

$$Cal+Dol=a+b(Ca+1.455 \text{ Mg}) \qquad (8)$$

where the values of a and b derived by a least absolute error regression analysis might be −7.5 and 2.69 respectively. The non-zero offset in the equation accounts for the minimal calcium contribution from plagioclase feldspar in sandstone. The carbonate estimate easily and accurately locates carbonate cementation at tens of percent, levels which were previously undetected by conventional log interpretation methods in the presence of heavy barite muds. In a preferred embodiment of the invention, Equation (8) easily and accurately locates carbonate cementation at levels ranging from 10 to 20 wt %. Referring to FIG. 7, the estimated carbonate substantially agrees with the measured sum of calcite plus dolomite for a plurality of wells. Equation (8) produces an estimate of the sum of calcite plus dolomite with a correlation coefficient between the measured and estimated sum of 0.98. Alternatively, magnesium logs from $P_e$ (Hertzog et al.) or direct measurement of magnesium (Roscoe et al.) may allow calculation of calcite and dolomite.

To further develop a more complete lithological description of a formation, the sand fraction composed primarily of quartz, feldspars, and micas, may be determined by subtracting the clay and carbonate fractions from 100 wt %.

Figure 8:
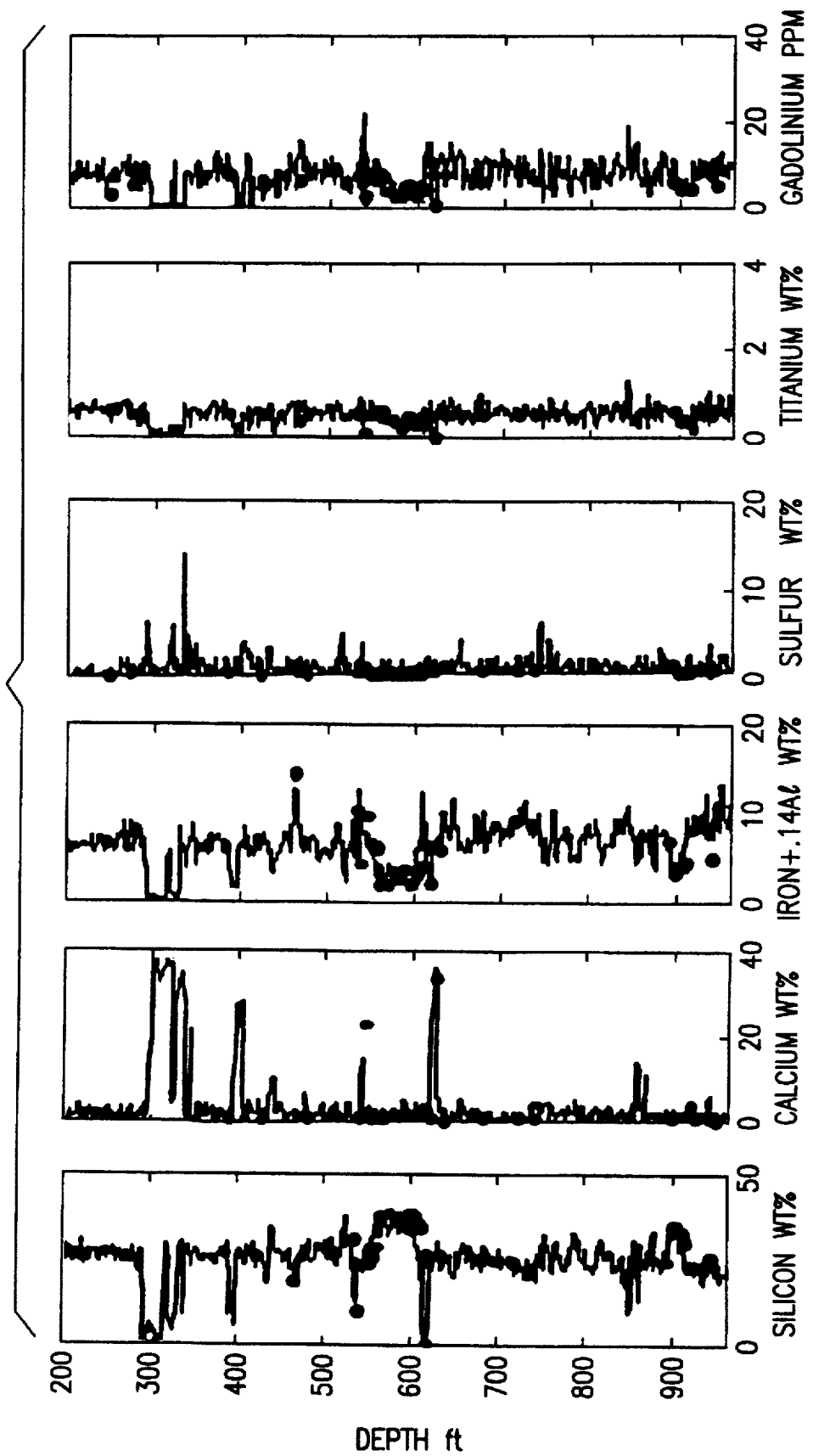
FIG. 8 shows an open hole elemental concentration well log.
Figure 9:
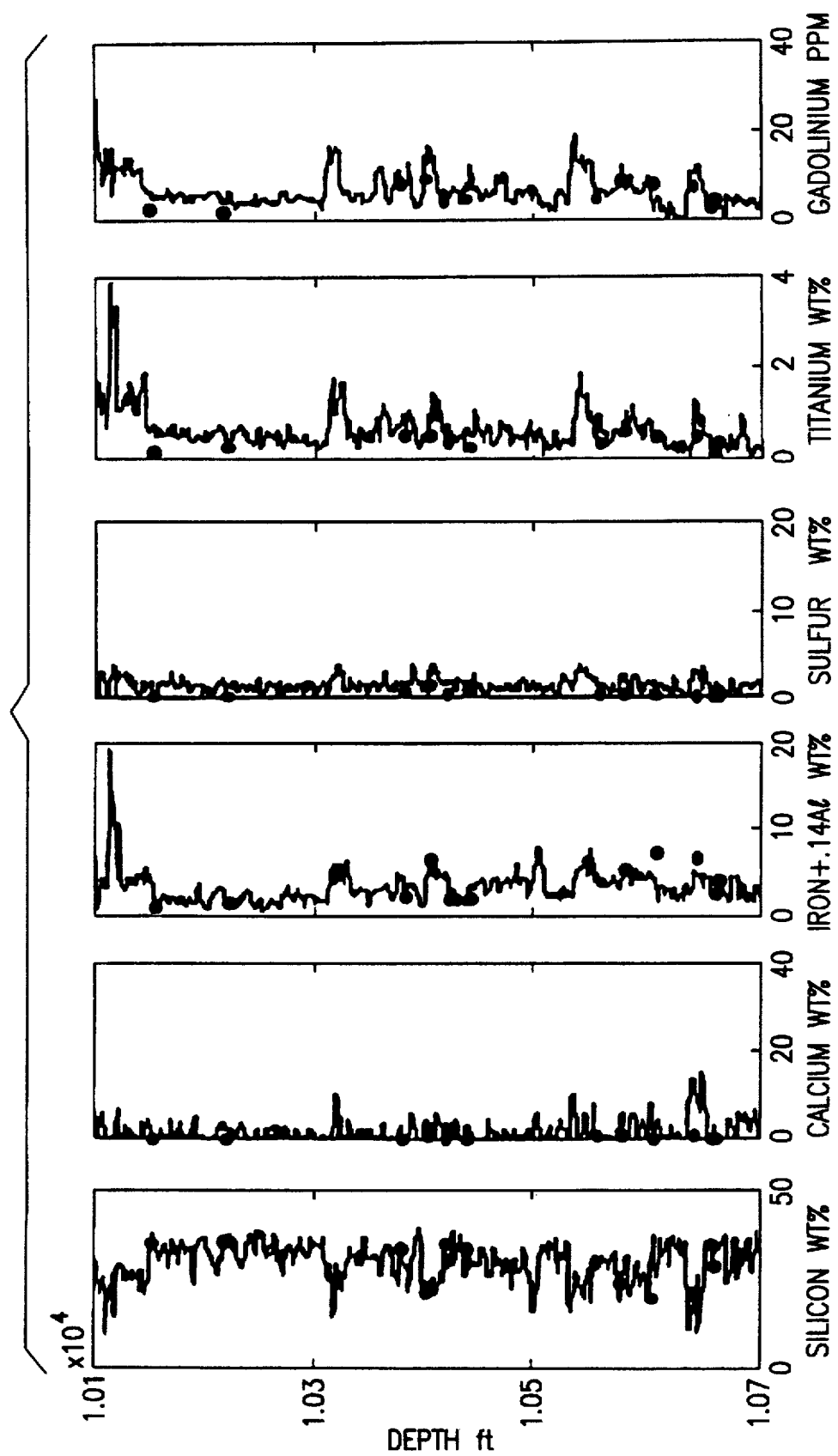
FIG. 9 shows a cased hole elemental concentration well log.

FIG. 8 represents an open hole elemental concentration log from the ECS sonde. FIG. 9 represents a cased hole elemental concentration log from the RST. In order to estimate the clay, carbonate, and sand fractions from induced gamma ray spectroscopy logs, equations 4, 5, and 6 must be modified to account for the aluminum interference in the iron measurement such that $$Clay_L=1.91(100-SiO_2-CaCO_3-1.99 \text{ FeAl}); \qquad (9)$$

$$(Clay+Mica)_L=2.43(100-SiO_2-CaCO_3-1.99 \text{ FeAl}); \text{ and} \qquad (10)$$

$$Clay2_L=-18.5+3.34(100-SiO_2-CaCO_3-1.99 \text{ FeAl}) \qquad (11)$$

where the L subscript designates application of the subject invention to log data and FeAl=Fe+0.14 Al.

The foregoing description of the preferred and alternate embodiments of the present invention have been presented for purposes of illustration and description. It is not intended to be exhaustive or limit the invention to the precise form disclosed. Obviously, many modification and variations will be apparent to those skilled in the art. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What we claim is:

1. A method for deriving the total clay content in a formation surrounding a borehole, comprising the steps of:

a) determining the concentrations of a plurality of elements in the formation without measuring an aluminum concentration; and, b) inputting a selected group of elemental concentrations obtained at step (a), including at least silicon, calcium, and iron, into a predetermined equation to derive total clay content in the formation.

2. A method according to claim 1, wherein the predetermined equation is derived from a least absolute error regression analysis on elemental and mineralogical data gained from a plurality of core samples.

3. A method according to claim 2, wherein the predetermined equation is represented by the formula:

$$Clay = c(100 - SiO_2 - CaCO_3 - MgCO_3 - dFe)$$

in which c and d are predetermined coefficients.

4. A method according to claim 3, further comprising the steps of determining a carbonate content of the formation and deriving a sand content of the formation from the total clay and the carbonate content.

5. A method according to claim 2, wherein the formation contains a substantial amount of non-clay aluminosilicates and the predetermined equation is represented by the formula:

$$Clay2 = e + f(100 - SiO_2 - CaCO_3 - MgCO_3 - gFe)$$

in which e, f, and g are predetermined coefficients.

6. A method according to claim 5, further comprising the steps of determining a carbonate content of the formation and deriving a sand content of the formation from the total clay and the carbonate content.

7. A method according to claim 1, wherein the elemental concentrations are determined from an elemental concentration log and the predetermined equation is derived from a least absolute error regression analysis on elemental and mineralogical data gained from a plurality of core samples.

8. A method according to claim 7, wherein the predetermined equation is represented by the formula:

$$Clay_L = c(100 - SiO_2 - CaCO_3 - dFeAl)$$

in which c and d are predetermined coefficients and the term FeAl represents the iron measurement from the elemental concentration log.

9. A method according to claim 7, wherein the predetermined equation is represented by the formula:

$$Clay2_L = e + f(100 - SiO_2 - CaCO_3 - gFeAl)$$

in which e, f, and g are predetermined coefficients and the term FeAl represents the iron measurement from the elemental concentration log.

10. A method for estimating an aluminum concentration in a formation surrounding a borehole, comprising the steps of:

a) determining concentrations of a plurality of elements in the formation without measuring the aluminum concentration; and, b) inputting a selected group of elemental concentrations obtained at step (a) into a predetermined equation to derive the aluminum concentration in the formation.

11. A method according to claim 10 wherein the selected group of elemental concentrations comprises at least silicon, calcium, and iron.

12. A method according to claim 11 wherein the predetermined equation is derived from a least absolute error regression analysis on elemental and mineralogical data gained from a plurality of core samples.

13. A method according to claim 12 wherein the predetermined equation is represented by the formula:

$$Al = a(100 - SiO_2 - CaCO_3 - MgCO_3 - bFe)$$

where a and b are predetermined coefficients.

14. A method according to claim 13 wherein the aluminum concentration is proportional to a total clay content of the formation.

15. A method according to claim 14 wherein the total clay correlates to the aluminum concentration according to the formula:

$$Clay = 4.95\, Al.$$

* * * * *